United States Patent [19]

Novak

[11] 4,266,098

[45] May 5, 1981

[54] DEVICE TO AUTOMATICALLY SCREEN INCOMING TELEPHONE CALLS, DETERMINE THE IDENTITY OF THE CALLER AND PROCESS THE CALL ACCORDINGLY

[76] Inventor: Albert P. Novak, 96 Cypress St., Floral Park, N.Y. 11001

[21] Appl. No.: 957,344

[22] Filed: Nov. 3, 1978

[51] Int. Cl.³ .......................................... H04M 15/06
[52] U.S. Cl. .................................... 179/5.5; 179/84 C
[58] Field of Search ................. 179/84 R, 84 C, 81 R, 179/89, 18 D, 18 FH, 6 R, 6 E, 2 A, 5.5

[56] References Cited

U.S. PATENT DOCUMENTS

| | | | |
|---|---|---|---|
| 3,654,396 | 4/1972 | Biezeveld | 179/18 D |
| 3,686,440 | 8/1972 | Kroeger | 179/5.5 |
| 3,784,721 | 1/1974 | Kilby | 179/84 C |
| 4,006,316 | 2/1977 | Bolgiano | 179/84 R |

FOREIGN PATENT DOCUMENTS 2538820 3/1977 Fed. Rep. of Germany ............ 179/5.5

Primary Examiner—Joseph A. Popek

[57] ABSTRACT

A device which monitors information contained in incoming telephone calls, and which, when attached to or combined with the circuitry of a telephone receiver, will automatically hold and display the identity of the caller while allowing the telephone bell to be rung only at certain times and/or for certain callers. The caller's identity can be determined by the called party without personally answering the telephone and without revealing to the caller whether the called party is at home or not. It can be used to automatically screen incoming calls and prevent the reception of calls which are unwanted. Accordingly, it can be used to allow wanted calls to ring the telephone's bell and thus, for example, awaken the user at night, while preventing all unwanted calls from disturbing the called party.

9 Claims, 2 Drawing Figures

DEVICE TO AUTOMATICALLY SCREEN INCOMING TELEPHONE CALLS, DETERMINE THE IDENTITY OF THE CALLER AND PROCESS THE CALL ACCORDINGLY

This invention pertains to telephony and relates more particularly to a device for screening and processing incoming calls.

Objects

Among the objects of my invention is to provide the user with a device for determining the caller's identity in advance of personally answering the call.

An additional object is to provide a device which will automatically limit reception of unwanted calls so that the user will not be called to answer his telephone unnecessarily i.e., the bell would not ring unless the call was wanted.

A further object of the invention is for such device to be capable to automatically screen out certain calls or callers at all times and other callers at certain times only.

A still further object of the invention is for such device to be compatable in operation with existing telephone circuitry and existing answering devices so that all features currently incorporated in such existing devices can be incorporated, if desired, into the invention.

Another object of the invention is for the device to operate without divulging to the caller why his call was not answered. It would thus prevent burglers from correctly assuming that an unanswered call indicated that the called party was not at home. Conversely, it would allow a user to not answer a call without offending a caller, as that caller would have no way of knowing that the user was, in fact, at home.

Other objects and advantages reside in the details of construction and operation as are more fully hereafter described and claimed, reference being had to the accompanying drawing forming a part thereof wherein like numerals refer to like parts throughout and in which:

Figure 1:
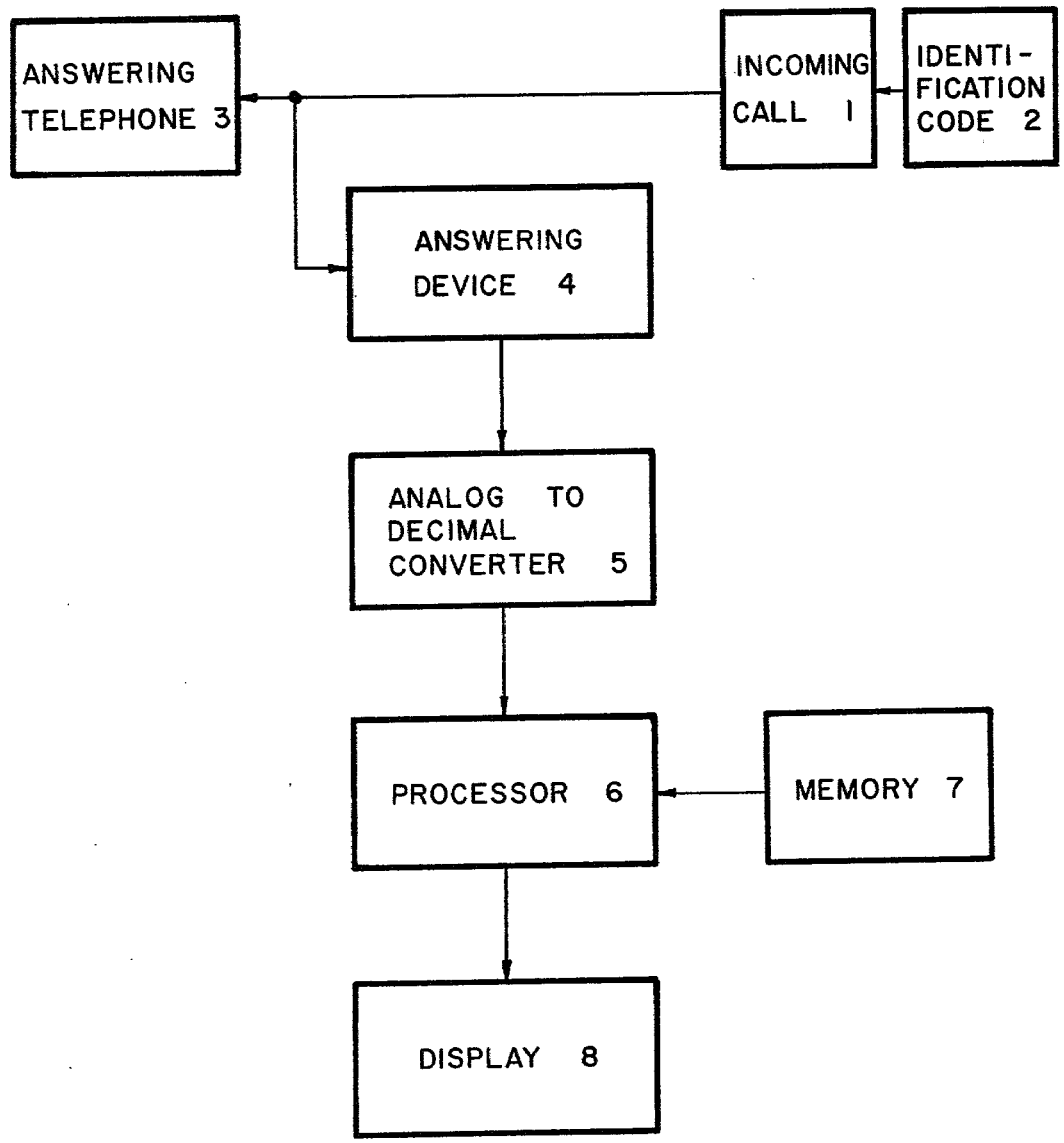
FIG. 1 is a generalized block diagram of the basic invention.
Figure 2:
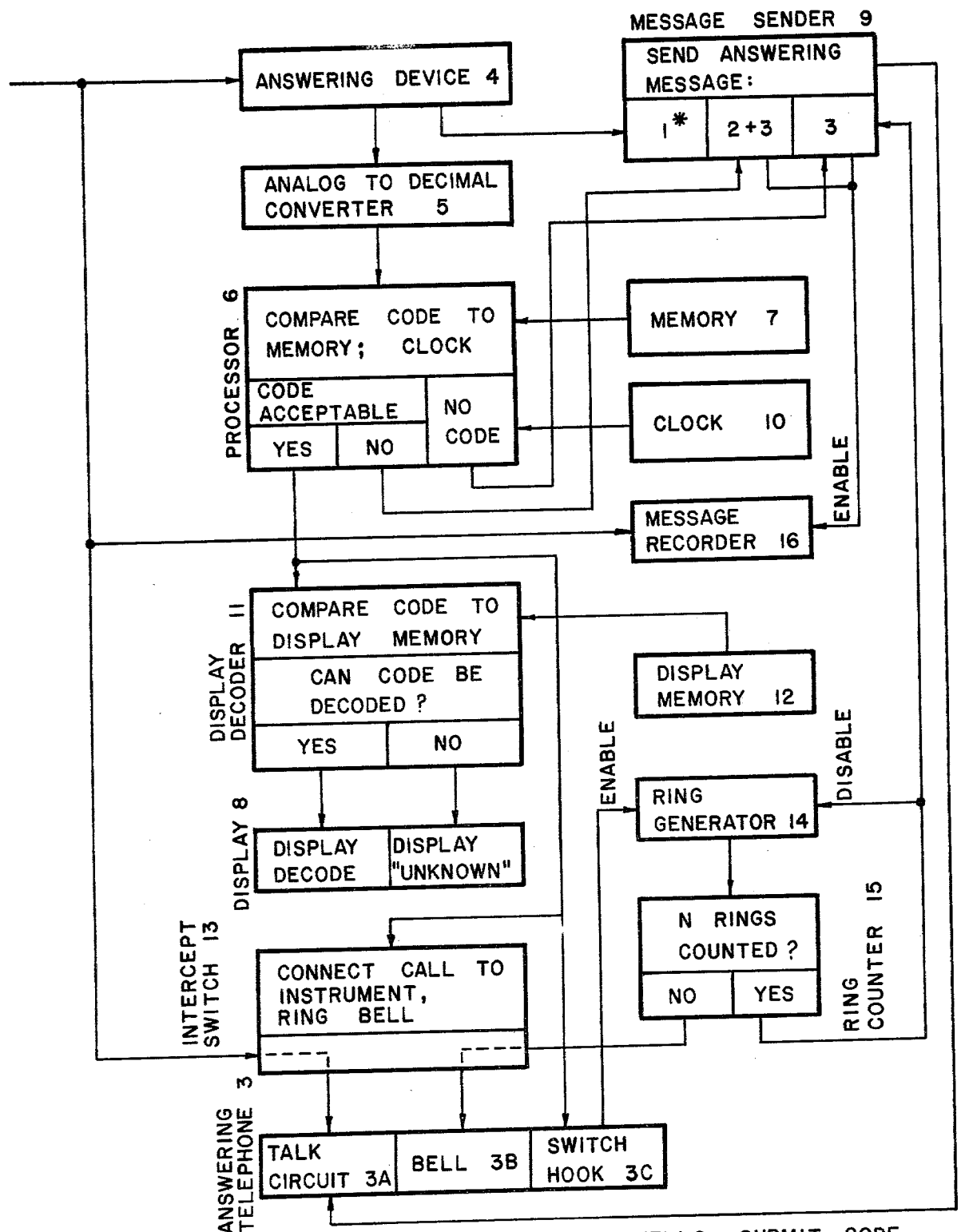
FIG. 2 is a functional block diagram of the invention showing the inventor's preferred embodiment.

In operation, incoming telephone calls 1 to answering telephone 3 are first intercepted by a telephone answering device 4 which, upon answering the call, would transfer incoming signals to an analog to decimal converter 5. As shown in FIG. 2, the answering device 4 could also, via message sender 9, convey an answering message to the caller to the effect that his call had been answered by an automatic device and invite the caller to transmit a predetermined code, but said message would not be essential to the operation of the invention.

Although in practice any type of analog signal may be used, for illustrative purposes a frequency-coded signal has been used in this description. Also, while any appropriate means can be used to transmit the signal, the means used as the example for this description is a tone generator as found on a Touch-Tone type telephone.

Upon having his call answered, the caller would transmit, via the answering device 4 to the analog to decimal converter 5 a predetermined code of one or more tones.

The analog to digital converter 5 would then convert the transmitted analog tones to digital form. Again, while in practice, any number of tones may be used for transmission of a code message, for illustrative purposes the inventor has chosen the use of a code consisting of a three-digit number.

This number would be compared, by processor 6 to numbers previously stored in memory 7. In the given example, decoded transmissions which are found to contain a three-digit number which exactly corresponds with a number previously stored in memory 7 by the device's user, as a number corresponding to that from which calls will be accepted, would also be sent by the processor 6 to a display 8.

Upon acceptance of a call, intercept switch 13, in the inventor's preferred embodiment, as shown in FIG. 2, would connect the incoming call to the talk circuit 3A of the answering telephone 3. In addition, upon acceptance of a call, and provided switch hook 3 was in a closed condition, corresponding to that which exists when the telephone handset is in place on its cradle, the processor 6 would also enable ring generator 14 to generate electrical impulses and operate bell 3B. The impulses generated by the ring generator 14 are counted as they are sent to bell 3B by the ring counter 15. If the telephone was not personally answered by the device's user prior to reaching a pre-set number of rings, the ring counter 15 would disable ring generator 14 and cause message sender 9 to send back to the caller a type 3 message to the effect that the device's user was not available and invite the caller to leave a message with message recorder 16.

In order to prevent a caller from determining why his call was unanswered, i.e., because the device's user was actually not available or because the caller's call was not acceptable at that time, processor 6 would, for all unacceptable calls trigger message sender 9 to send a recorded sound (message type 2) of telephone 3 ringing prior to its sending a type 3 message, and activating message recorder 16. Thus all callers would "hear" bell 3B ring, whether or not it in fact did so.

As shown in FIG. 2, it is also possible to set conditions upon which calls would be accepted. For example, by means of clock 10, wired to processor 6 certain calls may be programmed to be accepted at certain times only while other calls would always be accepted.

Another option would be the use of a display decoder 11 which via its own memory 12 would convert the three-digit number used in the given example to an alternate means of identification preprogrammed to correspond to each number. Such alternate means could be, for example, the caller's actual name.

An operational example of the preferred embodiment follows. In this example the device is equipped with a clock 10, answering message unit 9 and an incoming message recorder 16 and a display decoder 11 with memory 12. In the example, the device's user, who will be called Adam Jones, wishes to accept calls from Mary Jones or John Doe at any time, John Smith only between the hours of 8 AM to 11 PM and no other calls at any time. He has assigned the following code numbers: 1-2-3 to Mary Jones, 2-2-2 to John Doe and 3-3-3 to John Smith and has programmed processor 6 and its memory 7 accordingly. He has further programmed display decoder 11 to convert the code 1-2-3 so as to cause the display to read "Mary Jones," the code 2-2-2 to "John Doe," 3-3-3 to "John Smith" and any other code to "unknown."

All callers to Adam Jones would receive the following message: "Hello, this is Adam Jones. Please transmit your code." An uninformed or uncoded caller would either send no code or a guess. In either case display 8 would show the notation "unknown" and the bell 3B would not ring. Such callers would, via transmittal of a type 3 message by message sender 9, be invited to leave a message with message recorder 16.

Mary Jones, however, would send her code (1-2-3) which would be found by the processor 6, in searching its memory 7, to be a call acceptable at all times. Thus, regardless of the time at which her call was received, bell 3B would be made to ring and display 8, via decoder 11 and its memory 12, would show the notation "Mary Jones." Similarly, the code 2-2-2 received at any time will be converted to display "John Doe" and also cause bell 3B to ring.

The code 3-3-3, however, will ring the bell and be displayed as "John Smith" only if received during the preset hours (8 AM to 11 PM). At all other times the bell will not ring, although Mr. Smith would, via message type 2, "hear" it ring for a preset number of times before being informed, via a type 3 message, that Adam Jones was unavailable.

All callers whose calls were not personally answered by Adam Jones, either because: a. they had no code; b. their call (and code) was received during a time at which the device was programmed for non-acceptance; c. Adam Jones was not available to respond to the bell; or d. having responded to the bell, upon seeing the caller's identity desired not to answer, could leave their message with the incoming message recorder 16. No unanswered caller, however, could determine whether the reason for unanswering was b, c or d and thus become offended. A burgler, similarly, would not know for sure whether Adam Jones was, or was not, at home.

The foregoing description is intended as illustrative only and is not to be interpreted in the limiting sense.

I claim as new and useful in this invention the following items:

1. A system for the automatic identification of telephone callers for use in a conventional telephone system comprising:

an incoming signal; an identification code contained within said incoming signal, a unique code having been assigned to each caller; a receiving telephone station, including call-alerting means; automatic call-answering means for receiving at said telephone station said incoming signal and establishing an interconnection with an identification processing means for processing said identification code to determine the identity of the caller, said identification means comprising: signal sampling/conversion means for receiving said identification code and converting the information contained within said code into date bits representing digital words;

display means coupled to said identification means for displaying the identity of the caller, driven by the digital word output of said identification means, and arranged to produce at a single annunciator the identity of each identified caller, at the time said identification code is received.

2. The system of claim 1 wherein said display means is capable of alpha-numeric display and wherein a display decoding means is coupled to said display to convert the coded identity of the caller as furnished by said identification means to a decoded format for display.

3. The system of claim 2 wherein message receiving means is coupled to receive incoming signals, and coupled to and controlled by, said identification processing means for recording messages transmitted by the caller.

4. The system of claim 2 wherein message sending means is coupled to said call answering means and to said identification processing means for transmitting one or more selected answering messages to said caller, the content of said answering message selected and transmitted corresponding to the content of said identification code contained in said incoming signal.

5. The system of claim 4 wherein message receiving means is coupled to receive said incoming signals and to said message sending means for recording messages transmitted by the caller, in synchronization with the operation of said message sending means.

6. A system for the automatic identification of telephone callers for use in a telephone system comprising:

an incoming signal; an identification code contained within said incoming signal, a unique code having been assigned to each caller; a receiving telephone station, including call-alerting means; call-answering means for receiving at said telephone station said incoming signal;

disabling means coupled to said call-alerting means to prevent the operation of said call-alerting means directly by the incoming signal;

identification means coupled to said call answering means for processing said identification code to determine the identity of the caller, said identification means comprising: signal sampling/conversion means for receiving said identification code and converting the information contained within said code into data bits representing digital words;

display means coupled to said identification means for displaying the identity of the caller, driven by the digital word output of said identification means, and arranged to produce at a single annunciator the identity of each identified caller, at the time said identification code is received;

memory means coupled to said sampling/conversion means and adapted to store digital words therein;

programming means for storing selected words within said memory means, said selected words corresponding to the identification codes assigned to callers from which it is desired to receive calls;

processing means for comparing the output of said sampling/conversion means with the contents of said memory means to obtain a unique output from said processing means wherein the specific output obtained is determined by the result of said comparison;

and means for actuating the alerting means of the receiving station upon the presence of an enabling output from said processing means.

7. The system of claim 6 wherein said display means is capable of alphanumeric display and wherein a display decoding means is coupled to said display to convert the coded identity of the caller as furnished by said identification means to a decoded format for display.

8. The system of claim 6 wherein the acceptability of calls containing certain said identification codes is time dependent and wherein:

clock means is coupled to said processing means to provide time input signals to said processing means;

said digital words stored within said memory means, in addition to corresponding to the identification codes assigned callers from which it is desired to receive calls, contain time dependency information providing the time at which each identification code is conditionally acceptable;

and wherein an enabling output is provided to said alerting means only when, in addition to a match of said identity codes, said time input signal corresponds to said time dependency information contained within said digital words.

9. A system for the automatic identification of telephone callers for use in a telephone system comprising:

an incoming signal; an identification code contained within said incoming signal, a unique code having been assigned to each caller; a receiving telephone station, including call-alerting means; call-answering means for receiving at said telephone station said incoming signal;

disabling means coupled to said call-alerting means to prevent the operation of said call-alerting means directly by the incoming signal;

identification processing means coupled to said call-answering means for processing said identification code to determine the identify of the caller, said identification processing means comprising: signal sampling/conversion means for receiving said identification code and converting the information contained within said code into digital words;

alpha-numeric display means coupled to said identification processing means for displaying the identity of the caller, driven by the digital word output of said identification means, and arranged to produce at a single annunciator the identity of each identified caller, at the time said identification code is received;

display decoding means coupled to said display to convert the coded identity of the caller as furnished by said identification means to a decoded format for display;

memory means coupled to said sampling/conversion means and adapted to store digital words therein;

programming means for storing selected words within said memory means, said selected words corresponding to the identification codes assigned to callers from which it is desired to receive calls, and containing time dependency information providing the time at which each identification code is acceptable;

clock means to provide time input signals;

processing means coupled to said sampling/conversion means, to said memory means and to said clock means for comparing the output of said sampling/conversion means with the contents of said memory means and said time input signals, to obtain a unique output from said processing means, wherein the specific output obtained is determined by the result of said comparison;

means for actuating the alerting means of the receiving station upon the presence of an enabling output from said processing means;

message sending means coupled to said call answering means and to said processing means for transmitting one or more selected answering messages to said caller, the content of said message selected and transmitted determined by the specific output obtained from said processing means and corresponding to the content of said identification code contained in said incoming signal;

message receiving means coupled to receive said incoming signals and to said message sending means for recording messages transmitted by the caller, in synchronization with the operation of said message sending means.

* * * * *